United States Patent [19]
Kraus

[11] Patent Number: 4,999,887
[45] Date of Patent: Mar. 19, 1991

[54] PLASTIC BASE PLATE

[75] Inventor: Willibald Kraus, Grunstadt, Fed. Rep. of Germany

[73] Assignee: TRW United-Carr GmbH & Co., Enkenbach-Alsenborn, Fed. Rep. of Germany

[21] Appl. No.: 437,185

[22] Filed: Nov. 16, 1989

[30] Foreign Application Priority Data

Feb. 2, 1989 [DE] Fed. Rep. of Germany ....... 3903124

[51] Int. Cl.⁵ .............................................. A44B 17/00
[52] U.S. Cl. ....................................... 24/662; 24/304; 24/681; 24/682; 248/205.3
[58] Field of Search ................. 411/84, 85, 508, 509, 411/512, 513; 403/71, 407.1; 24/304, 572, DIG. 11, 662, 589, 664, 588, 681, 627, 614, 615, 682, 108; 248/205.3

[56] References Cited

U.S. PATENT DOCUMENTS

| | | | |
|---|---|---|---|
| 2,451,194 | 10/1948 | Braun | 248/205.3 X |
| 2,944,241 | 7/1960 | Londell, Jr. | 24/681 X |
| 3,133,777 | 5/1964 | Anhalt | 24/664 X |
| 3,454,249 | 7/1969 | Geisinger | 24/DIG. 11 |
| 3,532,316 | 10/1970 | Mathes | 248/205.3 |
| 3,606,433 | 9/1971 | Kunevicius | |
| 3,632,071 | 1/1972 | Cameron et al. | 248/205.3 X |
| 3,831,398 | 8/1974 | Davis, Sr. | 24/108 X |
| 3,999,871 | 12/1976 | Palmer et al. | 403/71 |
| 4,566,924 | 1/1986 | Hara et al. | 24/90 HA |
| 4,726,705 | 2/1988 | Gomes | 24/662 X |

FOREIGN PATENT DOCUMENTS

| | | | |
|---|---|---|---|
| 20285 | 6/1905 | Austria | 24/662 |
| 2807331 | 2/1978 | Fed. Rep. of Germany | . |
| 2930850 | 7/1979 | Fed. Rep. of Germany | . |
| 896043 | 2/1945 | France | 24/662 |
| 2542829 | 3/1983 | France | . |
| 2012860 | 1/1979 | United Kingdom | . |

*Primary Examiner*—James R. Brittain
*Attorney, Agent, or Firm*—Fay, Sharpe, Beall, Fagan, Minnich & McKee

[57] ABSTRACT

The disclosure relates to a plastic base plate 1 provided with a gluing surface 2 for allowing it to be fastened to a support. At least one coupling element 3 is arranged on the side opposite the gluing surface for connection with a fastening device. According to the disclosure, the gluing surface 2 of the base plate 1 is designed with an arched or concave shape where the lowest point P of the arching 4 lies in the zone directly below the coupling element 3.

8 Claims, 1 Drawing Sheet

PLASTIC BASE PLATE

BACKGROUND OF THE INVENTION

The invention relates to a plastic base plate having a gluing surface for fastening to a support, and with at least one coupling element arranged on the side opposite the gluing surface for connection to a fastening device.

Such base plates are often used in the automotive industry, for example, for holding cable straps, decorative strips or other objects to be placed against the body or inside the car. The objects are held, in each case, through a fastening device associated with the base plate.

Constructions are known in the prior art wherein the gluing surface is designed completely flat in order to provide the best possible contact to a support surface. (In this regard see, for example, German Disclosure 3,544,217, U.S. Pat. No. 3,606,433, German Disclosure 2,930,850, British Patent 2,012,860 and French Patent 2,542,829). Another possibility that exists, according to the known state of the art, is that the decorative strip to be fastened contains a magnetizable material which is magnetized before gluing the decorative strip to the base surface (German Disclosure 2,807,331). In this case, a fastening surface is provided with an opening for receiving glue.

It is common practice in these prior art constructions to provide the flattest gluing surface possible in order to attain the full effect of the glue in fastening to a support surface. The disadvantage of this practice becomes apparent if the support surface is uneven. When the support surface is uneven, the holding effect of the glue is insufficient.

This invention addresses the problem of designing a base plate of the kind mentioned so that a sufficient good holding effect is attained between the base plate surface provided with glue and the support surface even when an uneven support surface is used.

BRIEF DESCRIPTION OF THE INVENTION

The problems of the prior art are solved, according to the invention, by designing the gluing surface of the base plate with an arched concave configuration. The lowest point of the arching lies in the zone below the coupling element. Using this arched gluing surface assures a sufficient holding effect of the base plate to the support surface even in the case when an uneven support surface is used.

The base plate may have any desired shape, for example, round, rectangular or unsymmetrical. Through use of the concave arching configuration, it is possible in each case, with the aid of a tool, for example, to obtain a uniform pressure against the surface to be glued; and, thus, it is possible to obtain, even on uneven support surfaces, an optimal utilization of the glue. Also, because of the concave arching configuration, the base plate may be flexible, per se. Flexibility will allow the plate to adapt to uneven support surfaces. Concavity and flexibility lead, advantageously, to a lower required pressure with a higher resulting strength.

In a further embodiment of the invention, the base plate may be square while the surface provided with glue, over at least a partial zone, is either roughened or polished to a high gloss, according to the nature of the glue. It is also possible, according to the invention, that the coupling element be arranged central to the base plate. Here, in a further development of the invention, the coupling element may consist of a central hollow cylinder and two shell-form holding parts with catch projections arranged at equal distance from the central cylinder and lying opposite each other. The catch projections may, in each case, be directed toward the hollow cylinder. Preferably, the hollow cylinder has an opening passing through the lower zone and running transverse to the holding parts.

In another embodiment of the invention, the hollow cylinder may be provided in the upper zone with a conical shoulder. In this way, a further locking with a fastening device is possible. Moreover, the hollow cylinder may be provided on the inner or outer circumference with axially extending stays or ribs which have the purposes of limiting movement with a fastening device and preventing twisting between the base plate and the associated fastening device.

BRIEF DESCRIPTION OF THE DRAWING

The invention will be described in detail below with reference to the examples of a preferred embodiment represented in the drawing wherein.

DETAILED DESCRIPTION OF THE PREFERRED AND ALTERNATE EMBODIMENTS

Figure 1:
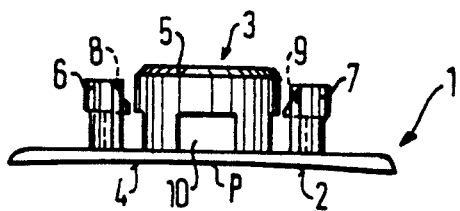
FIG. 1 is a side view of the base plate with an integral coupling element.

According to FIG. 1, a base plate 1 comprised of plastic has a surface 2 intended to be fastened to a support surface. Lying opposite surface 2 is coupling element 3 for connection to a fastening device (not shown), for example, a cable strap or another holding element. The surface 2 of the base plate 1 is a gluing surface and is designed, according to the invention, with an arched concave configuration with the lowest point P of the concave arching 4 lying in the zone directly below the coupling element 3. In this regard, it should be understood that the outer edges of surface 2 will generally engage first when surface 2 is pressed toward an associated support surface.

Figure 2:
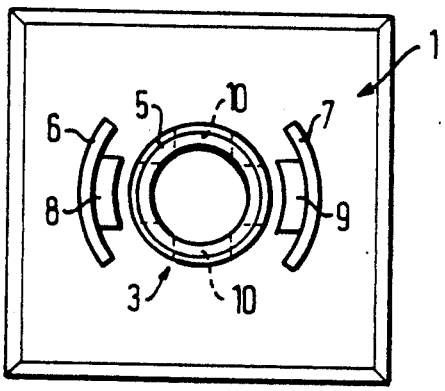
FIG. 2 view on the base plate according to FIG. 1.

From FIG. 2 it can be seen that the base plate 1 has a square peripheral shape. Other shapes can equally well be used. Moreover, it is possible for the gluing surface, at least over a partial zone, either to possess a roughened texture or to be polished to a high gloss in order to heighten the holding effect, depending upon the nature of the glue. It can further be seen, from FIGS. 1 and 2, that the coupling element 3 is arranged centrally on the base plate 1.

From FIGS. 1 to 4 it further appears that the coupling element 3 comprises a central hollow cylinder 5 and two shell-form holding parts 6 and 7 lying opposite each other and arranged at an equal distance from the central hollow cylinder 5. Each of these shell-form holding parts 6 and 7 is provided with a catch projection 8 and 9, respectively. From FIG. 3 it can be seen that these catch projections 8 and 9 are in each case directed toward the central hollow cylinder 5.

Figure 4:
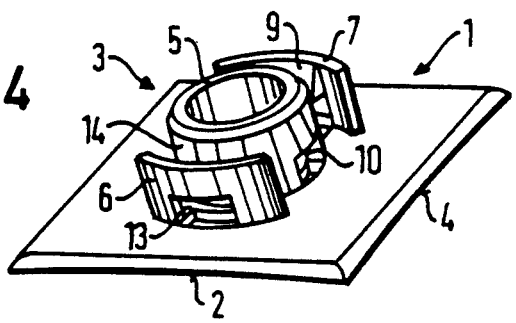
FIG. 4 a perspective view of the base plate of FIG. 1.

On the outer rim of the central hollow cylinder 5 are formed, in the design according to FIG. 4, axial stays or ribs 14. Below the catch projections 8 and 9 there may be openings 13 in the shell-form holding parts 6 and 7. Moreover, the central hollow cylinder 5 has an opening in the lower zone which passes through the cylinder transverse to the shell-form holding parts 6 and 7. When the shell-form holding parts 6 and 7 are no longer usable, the openings 10 and 13 make it possible, in case of repair, for example, to pull a cable strap through and refasten a pipe or a cable to the base plate.

Figure 3:
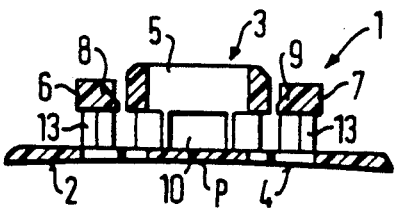
FIG. 3 a transverse section taken on line 3—3 of FIG. 2.

In the upper zone, according to FIGS. 3 and 4, the central hollow cylinder 5 has a circumferential bevel in order to allow the stud-form fastening element, which is lodged, for example, inside the central hollow cylinder 5, to engage properly.

Figure 5:
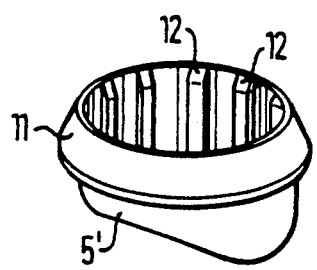
FIG. 5 a perspective view of another form of execution of a hollow cylinder of the coupling element.

In the form of execution according to FIG. 5, the hollow cylinder 5' is designed so that it has in the upper zone a conical shoulder 11, which contributes to the improvement of holding against a fastening device. To attain a protection against twisting and a further improvement of stopping (in place), the inner circumference of the hollow cylinder 5' may have stays or ribs 12 running axially.

Through the concave arched form of the gluing surface of the base plate 1 and through the special shaping of the coupling element 3, a holding unit is provided which, even with uneven support surfaces, assures sufficient fastening of the components.

What is claimed is:

1. In a plastic base plate (1) having an upper surface and a lower surface (2) with a coupling element (3) carried on the upper surface and the lower surface (2) serving as a gluing surface for joining the base plate to a support surface, the improvement wherein said lower surface (2) has an arched concave configuration with the innermost point (p) of the arched configuration being directly below the coupling element (3), the coupling element comprising a central hollow and upwardly open cylinder (5) with two shell-form holding elements parts (6,7) having catch projections (8,9) lying opposite each other at equal distances from the cylinder (5), said catch projections being directed toward the hollow cylinder (5).

2. The plastic base plate according to claim 1 wherein said plate has a square outer periphery.

3. The base plate according to claim 1 wherein the lower surface (2) is roughened over at least a partial zone.

4. The base plate according to claim 1 wherein the lower surface (2) is polished to a high gloss at least over a partial zone.

5. The base plate according to claim 1 wherein the coupling element (3) is arranged centrally on the base plate (1).

6. The base plate according to claim 1 wherein the hollow cylinder (5) has an opening (10) passing through its lower zone transverse to the holding parts (6,7).

7. The base plate according to claim 1 wherein the hollow cylinder (5) is provided in its upper zone with a conical shoulder (11).

8. The base plate according to claim 1 wherein the hollow cylinder (5) has axially running ribs (14) on its outer circumference.

* * * * *